United States Patent [19]
Takahara et al.

[11] Patent Number: 5,805,409
[45] Date of Patent: Sep. 8, 1998

[54] MULTI-LAYER ELECTRONIC PART HAVING EXTERNAL ELECTRODES THAT HAVE A THERMOSETTING RESIN AND METAL PARTICLES

[75] Inventors: Wataru Takahara; Takaya Ishigaki; Makoto Morita, all of Tokyo, Japan

[73] Assignee: TDK Corporation, Tokyo, Japan

[21] Appl. No.: 689,774

[22] Filed: Aug. 14, 1996

[30] Foreign Application Priority Data

Aug. 18, 1995 [JP] Japan ..................................... 7-210835

[51] Int. Cl.⁶ ..................................................... H01G 4/005
[52] U.S. Cl. ....................... 361/303; 361/313; 361/306.3; 361/321.2; 361/301.4
[58] Field of Search .................................. 361/303, 301.4, 361/305, 306.3, 309, 311–313, 321.1, 321.6; 29/25.42; 257/303, 306

[56] References Cited

U.S. PATENT DOCUMENTS

| | | | |
|---|---|---|---|
| 4,458,294 | 7/1984 | Womack | 361/321.3 |
| 5,561,587 | 10/1996 | Sanada | 361/306.1 |

FOREIGN PATENT DOCUMENTS

| | | |
|---|---|---|
| 60-170102 | 9/1985 | Japan . |
| 60-206884 | 10/1985 | Japan . |
| 62-242324 | 10/1987 | Japan . |
| 1-268753 | 10/1989 | Japan . |

*Primary Examiner*—Leo P. Picard
*Assistant Examiner*—Anthony Dinkins
*Attorney, Agent, or Firm*—Oblon, Spivak, McClelland, Maier & Neustadt, P.C.

[57] ABSTRACT

A multi-layer electronic part, such as a multi-layer ceramic capacitor, which comprises internal electrodes stacked alternately with layers of a dielectric material containing at least 50 wt % of lead in terms of PbO and external electrodes connected to the internal electrodes, the external electrodes each comprising a baked electrode layer connected to the internal electrodes; a plating layer having solderability; and a metal particle-containing electrode layer comprising a thermosetting resin and metal particles, between the baked electrode layer and the plating layer, the metal particle-containing electrode layer having a thickness of from 5 to 200 $\mu$m, the metal particle-containing electrode layer being disposed between the baked electrode layer and the plating layer.

7 Claims, 1 Drawing Sheet

MULTI-LAYER ELECTRONIC PART HAVING EXTERNAL ELECTRODES THAT HAVE A THERMOSETTING RESIN AND METAL PARTICLES

FIELD OF THE INVENTION

The present invention relates to a multi-layer electronic part, in particular a multi-layer electronic part which is prevented from developing cracks or other defects upon thermal deformation and has enhanced reliability.

BACKGROUND OF THE INVENTION

Multi-layer electronic parts are composed of a multi-layer structure containing internal electrodes and of external electrodes electrically connected to the internal electrodes. The external electrodes of conventional multi-layer electronic parts are composed of a baked electrode formed by baking, a plating layer formed thereon by plating having satisfactory soldering heat resistance, e.g., an Ni plating layer and a plating layer formed thereon having satisfactory solderability, e.g., an Sn or Sn/Pb plating layer. Plating layers are usually formed by plating in a solution. Since the baked external electrodes are porous, the plating solution penetrates through the external electrodes and reaches internal electrode layers. The penetration of the plating solution arouses a problem that the plating solution dissolves the glass component serving to maintain the adhesion strength between the base body and the external electrodes to deteriorate the external electrodes. Another problem is that the plating solution which has penetrated into the internal electrode layers deteriorates the insulation resistance of the multi-layer electronic part to reduce the reliability, in particular the moisture resistance, thereof. For eliminating these problems, for example, in multi-layer chip capacitors, there have been a technique of forming an external electrode which comprises a resin-based electroconductive layer, and a technique of forming an external electrode comprising a resin-based electroconductive layer on a thin layer formed for connection to an internal electrode by vapor deposition or electroless plating, as disclosed in JP-A-62-242324. (The term "JP-A") as used herein means an "unexamined published Japanese patent application.")

However, multi-layer electronic parts, e.g., multi-layer chip capacitors, employing a dielectric material containing at least 50 wt % lead in terms of PbO have the following problems. Because of the high coefficient of thermal expansion, the external electrodes develop cracks upon heating in, e.g., soldering, and are hence unable to ensure moisture resistance, in the case where the external electrode terminals have the constitution described above in which, for example, the external electrodes comprise the resin-based electroconductive layer directly connected to the internal electrodes. Further, the external electrode terminals connected to the internal electrodes are open to thereby have impaired strength. In the case where a thin layer is formed by vapor deposition or electroless plating and a resin-based electroconductive layer is formed thereon, use of such external electrodes result in a considerably heightened production cost, although the terminals of these electrodes have sufficient strength. The present invention eliminates the problems described above.

SUMMARY OF THE INVENTION

An object of the present invention is to provide a multi-layer electronic part which can be produced at low cost and has high reliability by employing the novel constitution of the external electrodes thereof.

Other objects and effects of the present invention will be apparent from the following description.

The present invention-relates to a multi-layer electronic part comprising internal electrodes stacked alternately with layers of a dielectric material containing at least 50 wt % of lead in terms of PbO, and external electrodes connected to said internal electrodes, the external electrodes each comprising a baked electrode layer connected to said internal electrodes; a plating layer having solderability; and a metal particle-containing electrode layer comprising a thermosetting resin and metal particles, provided between the baked electrode layer and the plating layer, the metal particle-containing electrode layer having a thickness of from 5 to 200 $\mu$m, the metal particle-containing electrode layer being disposed between said baked electrode layer and said plating layer.

DETAILED DESCRIPTION OF THE INVENTION

Figure 1:
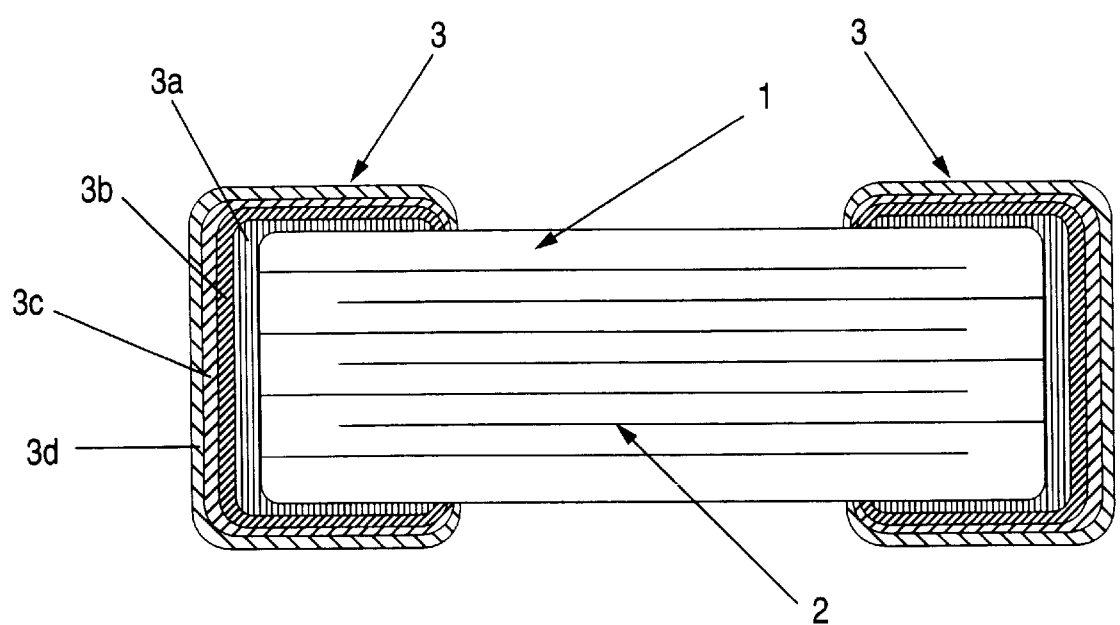
FIG. 1 shows a sectional view of a multi-layer ceramic capacitor.

For eliminating the problems inherent in multi-layer electronic parts employing a dielectric material containing at least 50 wt % lead in terms of PbO (for example, the dielectric material is susceptible to corrosion by an acidic or alkaline plating solution to impair reliability and mechanical strength), the multi-layer electronic part of the present invention which has internal electrodes and external electrodes electrically connected to the internal electrodes is characterized in that the external electrodes each is produced by forming a baked electrode layer on an external surface connected to the internal electrodes, forming thereon an electrode layer which comprises a thermosetting resin containing metal particles, and forming a plating layer having solderability. The plating layer having solderability preferably comprises a plating layer having excellent soldering heat resistance formed on the metal particle-containing electrode layer by plating and a plating layer having excellent solderability further formed thereon by plating.

Specifically, the thickness of the electrode layer comprising a thermosetting resin containing metal particles is preferably from 5 to 200 $\mu$m. If the thickness thereof is smaller than the lower limit, it is not preferred since cracking tends to occur frequently. If the thickness thereof exceeds the upper limit, it is also not preferred since equivalent series resistance (ESR) tends to be deteriorated.

The electrode layer comprising a thermosetting resin containing metal particles preferably has a content of the metal particles of from 70 to 95 wt % based on the total weight of the electrode layer. Metal particle contents thereof lower than the lower limit are not preferred since the ESR tends to be deteriorated, while metal particle contents thereof exceeding the upper limit are also not preferred since cracking tends to occur frequently.

The lower the resistivity of the electrode layer comprising a thermosetting resin containing metal particles, the better. The upper limit of the resistivity thereof is preferably $1\times10^{-2}$ $\Omega\cdot$cm. Resistivities thereof in the range of about from $1\times10^{-6}$ to $1\times10^{-3}$ $\Omega\cdot$cm suffice for practical use.

In the electrode layer comprising a thermosetting resin containing metal particles, the thermosetting resin is preferably at least one member selected from epoxy resins, urethane resins, and polyimide resins, and the metal particles are preferably particles of at least one member selected from Ag, Ni, Cu, and Pd.

The baked electrode layer connected to the internal electrodes preferably comprises Ag, an alloy of Ag and Pd, or Cu, and preferably Ag or an alloy of Ag and Pd. The production method of the baked electrode layer is not particularly limited, and it can be produced by printing (such as screen printing) a metallic paste containing these metals, followed by baking. The thickness of the baked electrode layer produced by printing is generally from 5 to 20 μm.

The plating layer having solderability preferably comprises an Ni plating layer having excellent soldering heat resistance coated with an Sn or Sn/Pb plating layer having excellent solderability. Alternatively, a Cu plating layer may firstly be formed, and then an Ni plating layer and an Sn or Sn/Pb plating layer may be formed thereon in this order.

Examples of the dielectric material containing at least 50 wt % of lead in terms of PbO include compositions represented by formulae $Pb(Mg_{1/3}Nb_{2/3})$—$PbTiO_3$—MnO, $Pb(Mg_{1/3}Nb_{2/3})$—$PbTiO_3$—$Pb(Mg_{1/2}W_{1/2})O_3$—MnO, and $Pb(Mg_{1/3}Nb_{2/3})$—$PbTiO_3$—$Pb(Mg_{1/3}Nb_{2/3})O_3$—MnO. Among these, $Pb(Mg_{1/3}Nb_{2/3})$—$PbTiO_3$—MnO and $Pb(Mg_{1/3}Nb_{2/3})$—$PbTiO_3$—$Pb(Mg_{1/2}W_{1/2})O_3$—MnO are preferred, and $Pb(Mg_{1/3}Nb_{2/3})$—$PbTiO_3$—MnO is more preferred. The dielectric material preferably contains from 50 to 90 wt % of lead in terms of PbO, and more preferably it contains from 60 to 70 wt % of lead in terms of PbO.

The multi-layer electronic part according to the present invention can have various applications, and it is preferably used as a multi-layer ceramic chip capacitor.

According to the constitution described above, the formation of the first layer (baked electrode layer) of each external electrode through baking enables the establishment of a satisfactory connection to the internal electrodes, and the formation of a metal particle-containing thermosetting resin layer as the second layer prevents the penetration of a plating solution to bring about improved moisture resistance. Further, the second layer also serves to mitigate the deformation of the multi-layer structure by thermal shock and prevents cracking, etc. As a result, a multi-layer electronic part having high reliability can be realized.

The present invention will be explained below in more detail by reference to embodiments thereof, but the present invention is not construed as being limited thereto.

EXAMPLE

In order to examine the effect of the thickness of the metal particle-containing resin layer on reliability, multi-layer chip capacitors having various thicknesses of the resin layer as shown in Table 1 were fabricated and subjected to evaluation for various electrical properties and to moisture resistance and thermal shock tests.

In FIG. 1 is shown a sectional view of a multi-layer capacitor as one embodiment of the present invention. Numeral 1 denotes a ceramic dielectric layer made of a material having the composition represented by formula $Pb(Mg_{1/3}Nb_{2/3})$—$PbTiO_3$—MnO consisting of 67.78 wt % of PbO, 25.74 wt % of $Nb_2O_3$, 1.26 wt % of $TiO_2$, 5.14 wt % of MgO, and 0.08 wt % of MnO. Further, numeral 2 denotes an internal electrode layer, 3 denotes an external electrode, 3a denotes a baked layer, 3b denotes a metal particle-containing electrode layer, 3c denotes an Ni plating layer, and 3d denotes an Sn/Pb plating layer.

Multi-layer chip capacitors were fabricated by the following method.

A dielectric paste containing lead oxide as a major component was formed into a green sheet with a doctor blade. An electroconductive paste prepared by mixing a fine Ag/Pd noble metal powder with a cellulose resin binder was applied in the form of a predetermined wiring pattern to the green sheet by screen printing to form an internal electrode layer 2. A hundred sheets thus obtained were superposed, hot-pressed, and then cut into a predetermined shape. The green chip thus obtained was heated to 400° C. in air to burn off the binder, and then fired at 1,100° C. in air for 2 hours to produce a capacitor element. The chip was then barrelled in order to ensure a sufficient degree of exposure of the internal electrodes prior to the formation of external electrodes by baking. Further, an electroconductive paste prepared by mixing Ag with a glass frit and a resin binder was applied and baked at 700° C. to form a first electrode layer. An electroconductive Ag-epoxy resin paste having an Ag content of 80 wt % was then coated in such an amount as to result in a metal particle-containing electrode layer having the thickness shown in Table 1, and the coated layer was cured at 150° to 180° C. Thereafter, an Ni layer and then an Sn/Pb layer were formed by electroplating.

Capacitance and dielectric loss were determined with an impedance analyzer (4284A, manufactured by YHP) under the conditions of 1 kHz and 1 Vrms.

Equivalent series resistance (hereinafter referred to as ESR) was determined with an impedance analyzer (4291A, manufactured by YHP) at 1 MHz.

Moisture resistance was examined by allowing each sample to stand at 60° C. and 90–95% RH for 500 hours and then determining the ESR thereof.

Thermal shock resistance was examined by subjecting ten test pieces for each sample to a 1,000-cycle thermal shock test in a temperature range of from –55° to 125° C. (according to JIS standard) and then polishing the test pieces to examine the same for cracks with a metallographic microscope. The number of cracked test pieces is shown.

Resistivity was determining by applying the metal particle-containing resin paste by printing to form a predetermined pattern, heat-curing the coating, and then measuring the resistivity thereof with a digital multimeter (R-6871, manufactured by Advantest Co., Ltd.).

Layer thickness was measured with a metallographic microscope after the sample was polished.

TABLE 1

Effect of resin layer thickness on electrical properties and reliability

| Sample No. | Resin layer thickness (μm) | Resistivity of film (Ω·cm) | Capacitance (pF) | tanδ (%) | ESR (mΩ) | ESR after moisture resistance test (mΩ) | Thermal shock resistance (number of cracked test pieces) |
|---|---|---|---|---|---|---|---|
| *1 | 2 | $4.2 \times 10^{-4}$ | 1001000 | 0.8 | 44.1 | 44.5 | 8/10 |
| 2 | 5 | $4.0 \times 10^{-4}$ | 1000900 | 0.8 | 44.5 | 45.0 | 0/10 |
| 3 | 50 | $3.9 \times 10^{-4}$ | 1001100 | 0.8 | 45.1 | 45.7 | 0/10 |
| 4 | 100 | $4.2 \times 10^{-4}$ | 1001000 | 0.8 | 46.3 | 46.8 | 0/10 |

TABLE 1-continued

Effect of resin layer thickness on electrical properties and reliability

| Sample No. | Resin layer thickness ($\mu$m) | Resistivity of film ($\Omega \cdot$ cm) | Capacitance (pF) | tan$\delta$ (%) | ESR (m$\Omega$) | ESR after moisture resistance test (m$\Omega$) | Thermal shock resistance (number of cracked test pieces) |
|---|---|---|---|---|---|---|---|
| 5  | 200 | $4.1 \times 10^{-4}$ | 1001000 | 0.8 | 48.0 | 49.2  | 0/10 |
| *6 | 250 | $4.0 \times 10^{-4}$ | 1001000 | 0.8 | 50.1 | 101.5 | 0/10 |

*1, *6: Comparative Examples
tan$\delta$: dielectric loss
ESR: equivalent series resistance Table 1 shows that the multi-layer chip capacitors in which the metal particle-containing resin layer had a thickness within the preferred range had satisfactory electrical properties and excellent moisture and thermal shock resistance. In the capacitor in which the resin layer had a thickness of 2 $\mu$m, cracking by thermal shock occurred in most of the test pieces. The reason for this may be as follows. The reduced resin layer thickness results in considerably impaired heat dissipation from the electrodes due to poor heat transfer and in a considerable temperature difference between parts, and this causes the multi-layer chip capacitor to have a heat deformation and hence develop cracks. Since multi-layer chip capacitors should be mounted on printed circuit boards by soldering, the capacitors should be free from the development of cracks and other defects caused by heat deformation, because such defects impair capacitor properties to reduce reliability. The capacitor in which the resin layer had a thickness of 250 $\mu$m had too high an ESR value after moisture resistance test. The reason for this may be that the resin layer having too large a thickness absorbs water and swells in the moisture resistance test and, hence, the metal particles come into less close contact with one another to deteriorate ESR. In general, multi-layer chip capacitors should have an ESR of 100 m$\Omega$ or lower because ESRs higher than 100 m$\Omega$ adversely influence capacitor performance.

In order to examine the effect of the metal content of the metal particle-containing electrode layer on reliability, multi-layer chip capacitors having various metal contents of the resin layer as shown in Table 2 were fabricated and subjected to evaluation for various electrical properties and to moisture resistance and thermal shock tests. The multi-layer chip capacitor samples were produced by the same method under the same conditions as the above, except that the metal content of the metal particle-containing resin layer was varied and the thickness thereof was fixed at 100 $\mu$m. The methods and apparatus used for the evaluation and tests were the same as the above.

TABLE 2

Effect of the metal content of resin layer on electrical properties and reliability

| Sample No. | Metal content of resin layer (wt %) | Resistivity of film ($\Omega \cdot$ cm) | Capacitance (pF) | tan$\delta$ (%) | ESR (m$\Omega$) | ESR after moisture resistance test (m$\Omega$) | Thermal shock resistance (number of cracked test pieces) |
|---|---|---|---|---|---|---|---|
| 7  | 65 | $5.1 \times 10^{-2}$ | 922000  | 1.0 | 110.2 | 184.3 | 0/10 |
| 8  | 70 | $1.7 \times 10^{-4}$ | 1001000 | 0.8 | 47.8  | 49.2  | 0/10 |
| 4  | 80 | $4.2 \times 10^{-4}$ | 1001000 | 0.8 | 46.3  | 46.8  | 0/10 |
| 9  | 95 | $1.0 \times 10^{-5}$ | 1001100 | 0.8 | 45.3  | 45.5  | 0/10 |
| 10 | 98 | $1.5 \times 10^{-5}$ | 1001100 | 0.8 | 44.8  | 45.0  | 5/10 | tan$\delta$: dielectric loss
ESR: equivalent series resistance

Table 2 shows that the multi-layer chip capacitors in which the resin layer contained metal particles in an amount within the preferred range had satisfactory electrical properties and excellent moisture and thermal shock resistance. The capacitor in which the resin layer had a metal content of 65 wt % had an ESR value higher than 100 m$\Omega$ before and after the moisture resistance test, such ESR values being not preferred as described above. The reason for such high ESR values may be that the resin in the resin layer, in which the metal particles are in less close contact with one another, swells upon water absorption to deteriorate ESR. The capacitor in which the resin layer had a metal content of 98 wt % is not preferred in that cracking by thermal shock occurred in a considerable proportion of the test pieces. The reason for this may be as follows. In the electrode layers, the metal particles are in almost no contact with the resin although in close contact with one another. Due to the absence of the part which functions to buffer the thermal expansion of the metal particles, the electrode parts develop cracks upon heating.

In order to examine the effect of the kinds of the resin and metal in the metal particle-containing resin layer on reliability, multi-layer chip capacitors in which the kinds of the resin and metal were varied as shown in Table 3 were fabricated and subjected to evaluation for electrical properties and to moisture resistance and thermal shock tests. The multi-layer chip capacitor samples were produced by the same method under the same conditions as the above, except that the kinds of the resin and metal in the resin layer were varied and the thickness thereof was fixed at 100 $\mu$m. The methods and apparatus for the evaluation and tests were the same as the above.

TABLE 3

Effect of the kinds of resin and metal in resin layer on electrical properties and reliability

| Sample No. | Resin in resin layer | Metal in resin layer and its amount (wt %) | Resistivity of film ($\Omega \cdot$ cm) | Capacitance (pF) | tan$\delta$ (%) | ESR (m$\Omega$) | ESR after moisture resistance test (m$\Omega$) | Thermal shock resistance (number of cracked test pieces) |
|---|---|---|---|---|---|---|---|---|
| 4  | epoxy     | Ag 80 | $4.2 \times 10^{-4}$ | 1001000 | 0.8 | 46.3 | 46.8 | 0/10 |
| 11 | urethane  | Ag 80 | $4.0 \times 10^{-4}$ | 1001100 | 0.8 | 45.8 | 48.0 | 0/10 |
| 12 | polyimide | Ag 80 | $4.2 \times 10^{-4}$ | 1001000 | 0.8 | 46.1 | 49.2 | 0/10 |
| 13 | epoxy     | Ni 80 | $8.1 \times 10^{-3}$ | 1000800 | 0.8 | 62.4 | 68.2 | 0/10 |
| 14 | epoxy     | Cu 80 | $2.1 \times 10^{-3}$ | 1000900 | 0.8 | 37.6 | 40.1 | 0/10 |
| 15 | epoxy     | Pd 80 | $6.3 \times 10^{-3}$ | 1000700 | 0.8 | 57.3 | 59.7 | 0/10 |
| 16 | epoxy     | Ni 90 | $9.6 \times 10^{-4}$ | 1011000 | 0.8 | 52.4 | 57.6 | 0/10 |
| 17 | epoxy     | Ni 70 | $1.0 \times 10^{-2}$ | 1034000 | 0.8 | 72.3 | 80.7 | 0/10 |
| 18 | epoxy     | Pb 90 | $8.1 \times 10^{-4}$ | 1026000 | 0.8 | 49.6 | 54.8 | 0/10 |
| 19 | epoxy     | Pb 70 | $9.2 \times 10^{-3}$ | 1031000 | 0.8 | 59.4 | 67.1 | 0/10 | tan$\delta$: dielectric loss
ESR: equivalent series resistance

Table 3 shows that the capacitors in which the second layer of each external electrode had been formed from an electroconductive paste comprising a resin selected from epoxy, urethane, and polyimide resins and at least one metal selected from Ag, Ni, Cu, and Pd, as shown in claim 4, could be multi-layer electronic parts having satisfactory properties and high reliability.

As apparent from the above description, according to the present invention, a multi-layer electronic part comprising internal electrodes stacked alternately with layers of a dielectric material containing at least 50 wt % lead in terms of PbO can be prevented from developing cracks caused particularly by heat deformation, by forming external electrodes each comprising a first layer (baked electrode layer) connected to the internal electrodes formed by baking and a second layer formed thereon comprising a thermosetting resin containing metal particles, and by forming a plating layer with excellent solderability on the second layer by plating. Thus, a highly reliable electronic part can be provided.

While the invention has been described in detail and with reference to specific examples thereof, it will be apparent to one skilled in the art that various changes and modifications can be made therein without departing from the spirit and scope thereof.

What is claimed is:

1. A multi-layer electronic part comprising internal electrodes stacked alternately with layers of a dielectric material containing at least 50 wt % of lead in terms of PbO, and external electrodes connected to said internal electrodes, said external electrodes each comprising a baked electrode layer connected to said internal electrodes; a plating layer having solderability; and a metal particle-containing electrode layer comprising a thermosetting resin and metal particles, provided between said baked electrode layer and said plating layer, said metal particle-containing electrode layer having a thickness of from 5 to 200 $\mu$m, said metal particle-containing electrode layer being disposed between said baked electrode layer and said plating layer.

2. A multi-layer electronic part as claimed in claim 1, wherein said metal particle-containing electrode layer has a content of said metal particles of from 70 to 95 wt % based on the total weight of said metal particle-containing electrode layer.

3. A multi-layer electronic part as claimed in claim 1, wherein said metal particle-containing electrode layer has a resistivity of $1 \times 10^{-2}$ $\Omega \cdot$cm or lower.

4. A multi-layer electronic part as claimed in claim 3, wherein said thermosetting resin contained in said metal particle-containing electrode layer is at least one member selected from the group consisting of epoxy resins, urethane resins, and polyimide resins; and said metal particles are particles of at least one member selected from the group consisting of Ag, Ni, Cu, and Pd.

5. A multi-layer electronic part as claimed in claim 1, wherein said external electrodes comprises Ag or an alloy of Ag and Pd.

6. A multi-layer electronic part as claimed in claim 1, wherein said plating layer comprises an Ni plating layer coated with an Sn or Sn/Pb plating layer.

7. A multi-layer electronic part as claimed in claim 1, wherein said multi-layer electronic part is a multi-layer ceramic chip capacitor.

* * * * *